US008543009B2

(12) United States Patent
Bulot et al.

(10) Patent No.: US 8,543,009 B2
(45) Date of Patent: Sep. 24, 2013

(54) METHOD AND APPARATUS FOR SYNTHESIZING ULTRA-WIDE BANDWIDTH WAVEFORMS

(75) Inventors: Jean-Paul Bulot, El Segundo, CA (US); Matthew J. Klotz, Pasadena, CA (US)

(73) Assignee: Raytheon Company, Waltham, MA (US)

( * ) Notice: Subject to any disclaimer, the term of this patent is extended or adjusted under 35 U.S.C. 154(b) by 71 days.

(21) Appl. No.: 12/960,085

(22) Filed: Dec. 3, 2010

(65) Prior Publication Data

US 2012/0141141 A1 Jun. 7, 2012

(51) Int. Cl.
*H04B 10/04* (2011.01)
*H04B 10/12* (2011.01)

(52) U.S. Cl.
USPC ............................ 398/183; 398/182; 398/186

(58) Field of Classification Search
USPC .................................................. 398/182–201
See application file for complete search history.

(56) References Cited

U.S. PATENT DOCUMENTS

| | | | | |
|---|---|---|---|---|
| 2002/0181041 | A1* | 12/2002 | Tong | 359/123 |
| 2007/0104492 | A1* | 5/2007 | Betts | 398/183 |
| 2009/0067843 | A1* | 3/2009 | Way et al. | 398/79 |
| 2009/0103924 | A1* | 4/2009 | Kawanishi et al. | 398/115 |
| 2009/0214210 | A1* | 8/2009 | Yu et al. | 398/65 |
| 2009/0297155 | A1 | 12/2009 | Weiner et al. | |
| 2009/0304393 | A1 | 12/2009 | Kawanishi et al. | |
| 2010/0008680 | A1* | 1/2010 | Chen et al. | 398/198 |
| 2010/0104294 | A1* | 4/2010 | Chen et al. | 398/183 |
| 2010/0150495 | A1* | 6/2010 | Kawanishi et al. | 385/3 |
| 2012/0002972 | A1* | 1/2012 | Stiffler et al. | 398/115 |

OTHER PUBLICATIONS

Macleod, "Thin-Film Optical Filters", Adam Hilger Ltd., 1969 (pp. 1-7, 88-110, 236-238).
European Search Report for European Application No. 11183170.7, filed Sep. 28, 2011, European Search Report dated Mar. 26, 2012 and mailed Apr. 2, 2012 (9 pgs.).
Tetsuya Kawanishi, et al., "Ultra-wideband frequency chirp signal generation by using high-speed optical frequency control with optical single-sideband modulation technique", Microwave Photonics, 2006 MWP '06, International Topical Meeting On, IEEE, PI, Oct. 1, 2006 (pp. 1-4).
Atsushi Kanno, et al. "12.8-GHz-Bandwidth Frequency Chirp Signal Generation with High-Extinction-Ratio Optical Modulator by Optical Frequency Doubling Technique", Microwave Photonics (MWP), 2010 IEEE Topical Meeting On, IEEE, Piscataway, NJ, USA, Oct. 5, 2010 (pgs. 283-285).

* cited by examiner

*Primary Examiner* — Danny Leung
*Assistant Examiner* — Daniel Dobson
(74) *Attorney, Agent, or Firm* — Christie, Parker & Hale, LLP

(57) ABSTRACT

In accordance with various aspects of the disclosure, a method and apparatus is disclosed for increasing waveform bandwidth of an optical frequency waveform during optical double sideband suppressed carrier modulation. An optical modulator is configured to operate in double sideband, suppressed carrier modulation (DSB-SC) mode producing multiple optical sidebands and optical sideband harmonics. Proper selection of the appropriate optical harmonic via optical filter enables the synthesis of ultra-wideband single-sideband, suppressed carrier (SSB-SC) optical waveforms while simultaneously simplifying the radio frequency (RF) circuitry that generates the modulating radio frequency waveform.

16 Claims, 5 Drawing Sheets

METHOD AND APPARATUS FOR SYNTHESIZING ULTRA-WIDE BANDWIDTH WAVEFORMS

BACKGROUND

This disclosure relates generally to the field of optics and, more specifically, to a method and apparatus for synthesizing ultra-wide bandwidth optical waveforms.

As waveforms are synthesized with increasing larger bandwidths, radio frequency (RF) design tends to grow in complexity. RF component design criteria such as power, amplitude ripple, gain flatness, phase distortion over bandwidth become increasingly more difficult to maintain with increasing bandwidths. What is need is an improved mechanism to increase waveform bandwidth of a radio frequency waveform during double sideband suppressed carrier modulation.

SUMMARY

In accordance with various embodiments of this disclosure, a method of increasing waveform bandwidth of an optical frequency waveform during double sideband suppressed carrier modulation is disclosed. The method comprises receiving a radio frequency waveform by a bandwidth multiplier and increasing a bandwidth of the received radio frequency waveform; and providing the bandwidth increased radio frequency waveform to a radio-frequency input of an optical modulator to generate additional waveform bandwidth of the optical frequency waveform during double sideband suppressed carrier modulation.

In accordance with various embodiments of this disclosure, an apparatus for increasing waveform bandwidth of an optical frequency waveform during double sideband suppressed carrier modulation is disclosed. The apparatus comprises a bandwidth multiplier arranged to receive a radio frequency waveform and to increase a bandwidth of the received radio frequency waveform; and an optical modulator including a radio-frequency input that is arranged to receive the bandwidth increased radio frequency waveform, wherein the optical modulator is arranged to generate additional waveform bandwidth of the optical frequency waveform during double sideband suppressed carrier modulation.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
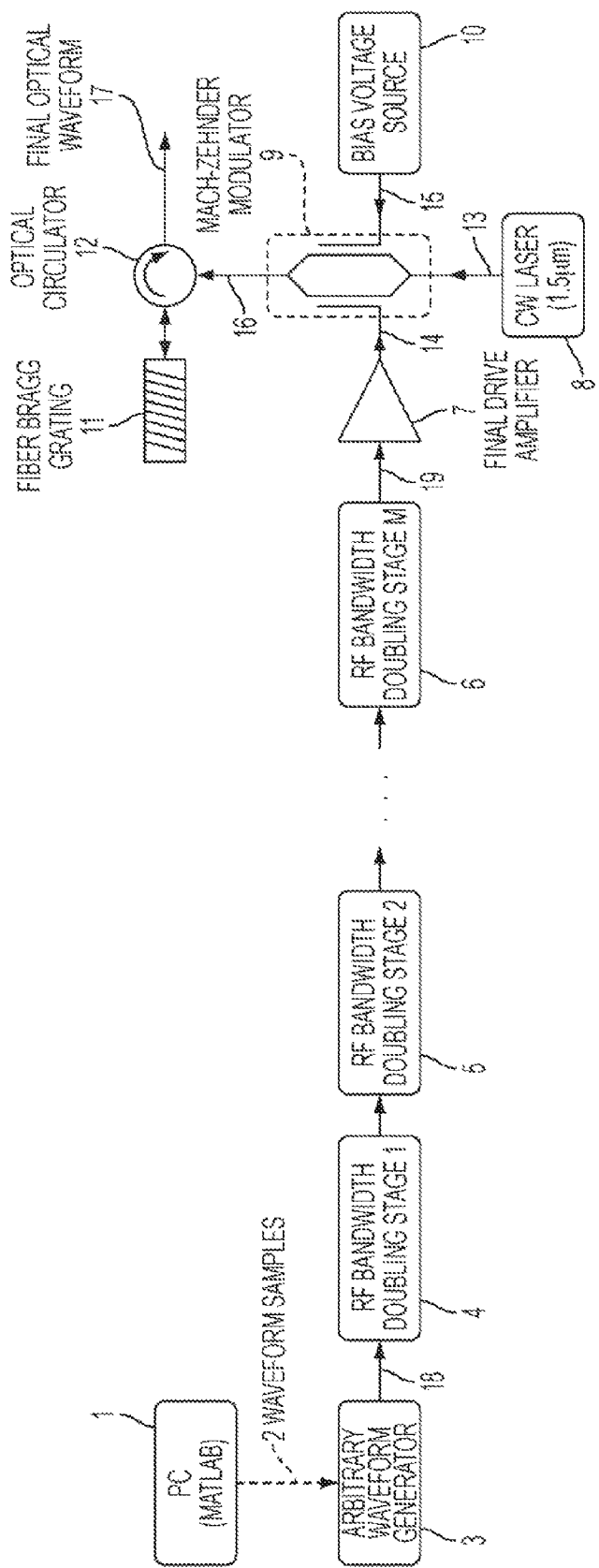
FIG. 1 shows an example block diagram for high bandwidth optical waveform synthesis in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 shows an example block diagram for synthesizing high bandwidth, single-sideband, linear frequency modulated optical waveforms. Waveform synthesis begins with the creation of digital samples of a baseband waveform on a computer, using numerical software platform (1). Software platform (1) can be software such as MATLAB manufactured by The MathWorks headquartered in Natick, Mass.; however, other suitable software platform may be used. Digital samples (2) are transferred from the computer to a memory inside Arbitrary Waveform Generator (3). Arbitrary Waveform Generator (3) clocks waveform samples from memory to a digital-to-analog converter, producing the baseband radio frequency (RF) waveform (18) with bandwidth $\Delta f_{BASEBAND}$.

Conversion of the baseband RF waveform (18) to the final RF waveform (19) with bandwidth $\Delta f_{FINAL}$ requires a total of M stages of RF upconversion, or frequency doubling circuitry (4), (5) and (6). Equation 1 describes the relationship between the baseband RF waveform (18), the number of modification stages, M, and the final RF waveform bandwidth (19).

$$\Delta f_{FINAL} = (2^M) * \Delta f_{BASEBAND} \tag{1}$$

Final RF waveform (19) is amplified by RF amplifier (7) and injected into RF waveform port (14) of optical modulator (9). Optical modulator (9) can be a Mach-Zehnder optical modulator; however, other suitable optical modulators may be used. For ease of discussion in this disclosure, optical modulator (9) will be described as a Mach-Zehnder optical modulator. A nominal 1.5 μm wavelength narrow-linewidth laser source (8) is injected into optical input (13) and a voltage bias source (10) is injected into bias port (15). Optical modulator (9) modulates optical carrier (13) based upon RF input (14) and voltage bias (15), producing a modulated optical signal at output (16).

Optical modulator (9) can be configured to produce modulated optical signal (16) known as a double-sideband suppressed carrier (DSB-SC) waveform. For example, optical modulator (9) can be a Mach-Zehnder optical modulator.

Figure 2:
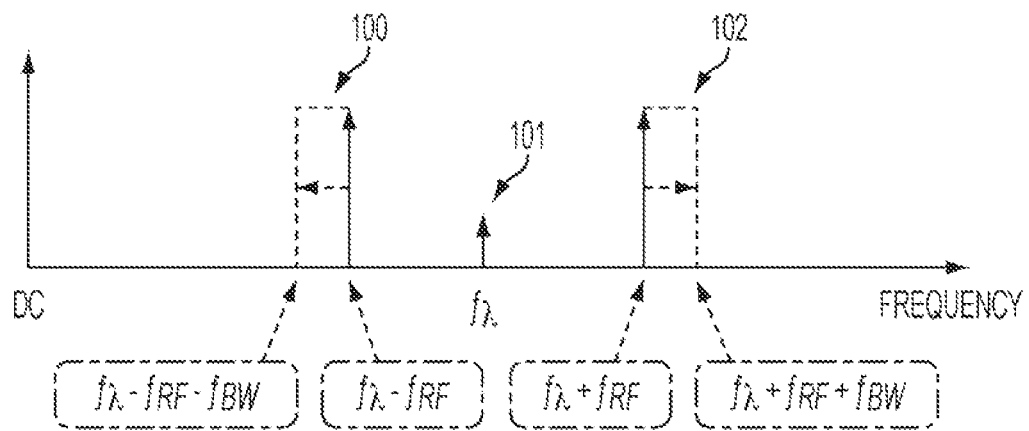
FIG. 2 shows an example of a frequency diagram for double sideband suppressed carrier modulation in accordance with various aspects of the present disclosure.

FIG. 2 depicts the frequency spectrum of a DSB-SC optical waveform (16) showing residual optical carrier (101), first-order upper sideband (102) and first-order lower sideband (100). As can be seen in FIG. 2, optical carrier signal (101) is suppressed in strength in relation to both first-order upper sideband waveform (102) and first-order lower sideband waveform (100). The upper and lower sidebands waveforms have bandwidth $f_{BW}$ Hertz shown by a dotted line. The upper sideband starts at frequency $f_\lambda + f_{RF}$ and extends in bandwidth to $f_\lambda + f_{RF} + f_{BW}$. The lower sideband starts at frequency $f_\lambda - f_{RF}$ and extends in bandwidth to $f_\lambda - f_{RF} - f_{BW}$. The upper and lower sidebands define the frequency offset from the carrier at $f_\lambda$. By way of a non-limiting example, at optical wavelengths near $\lambda = 1.55$ μm, $f_\lambda$ is approximately 192 THz, while $f_{RF}$ is approximately 16 GHz.

The DSB-SC optical waveform (16) can be passed through optical circulator (12) to bandpass optical filter (11), such as Fiber Bragg Grating which can be configured to filter out one sideband while operating in reflection mode. As shown in FIG. 1, bandpass optical filter (11) may be a Fiber Bragg Grating (FBG); however, other suitable optical filters may be used. Optical filter (11) can be configured to act as an optical bandpass filter reflecting the optical sideband of interest while removing the other optical sideband and residual optical carrier. The result of the optical filtering is a single-sideband (SSB) optical modulation and the resulting SSB optical waveform has the RF signal characteristics imposed onto the optical carrier. Final optical waveform (17) is known as a single-sideband suppressed-carrier waveform (SSB-SC).

Figure 3:
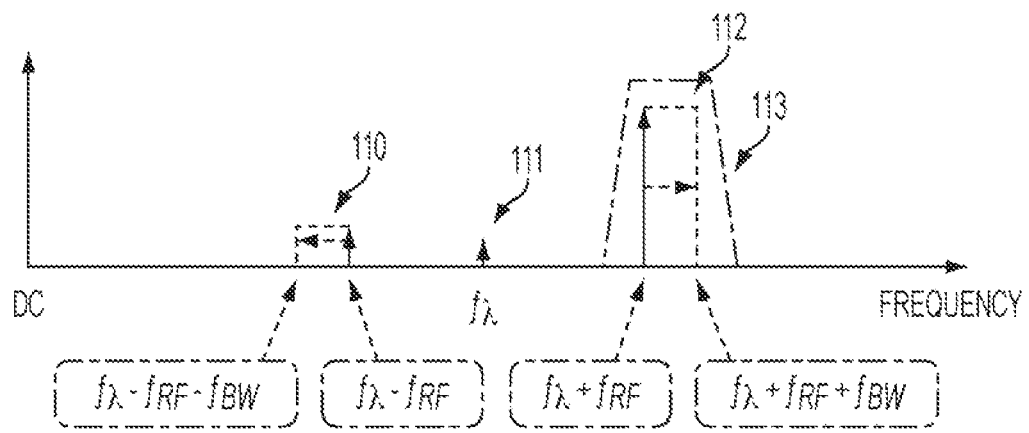
FIG. 3 shows an example of a frequency diagram for single sideband suppressed carrier modulation in accordance with various aspects of the present disclosure.

FIG. 3 depicts the frequency spectrum of a SSB-SC optical waveform, showing residual optical carrier (111), residual first-order lower sideband (110), first-order upper sideband signal (112) (also shown at 17 in FIG. 1) and optical filter (113), such as the Fiber Bragg Grating (also shown at 11 in FIG. 1). As can be seen in FIG. 3, both the residual carrier at a frequency of $f_\lambda$ and the lower sideband starting at frequency $f_\lambda - f_{RF}$ and with bandwidth extending to $f_\lambda - f_{RF} - f_{BW}$ are both suppressed in strength in relation to the upper sideband waveform. In an embodiment, the Fiber Bragg Grating does not eliminate the residual carrier and lower sideband entirely; however it is attenuated by 30 dBc or more, relative to the signal power of the upper sideband. The dotted-dashed line around the upper sideband waveform the selection of this sideband waveform resulting from the FBG filter.

Figure 4:
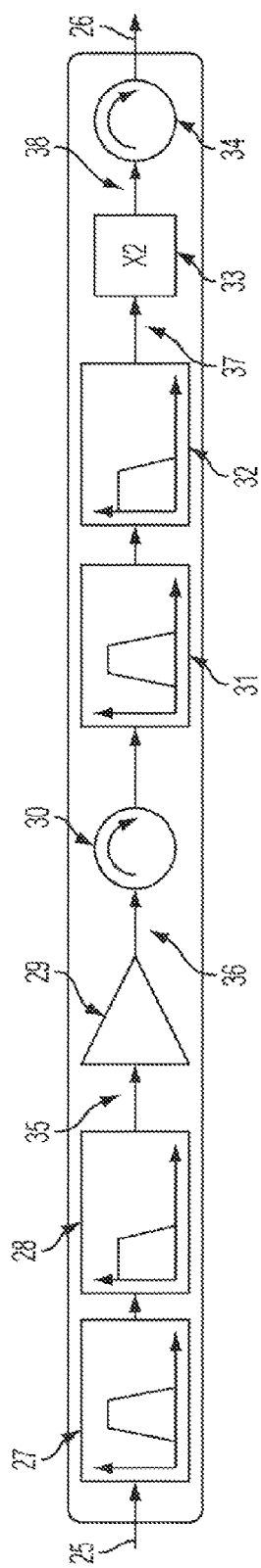
FIG. 4 shows an example block diagram of radio frequency doubling stage in accordance with various aspects of the present disclosure.

Each of the RF upconversion or doubling stages (4,) (5) and (6) of FIG. 1 can be expanded to show individual components; this is depicted in FIG. 4. Input RF signal (25) can be filtered via bandpass (27) and low-pass (28) filters before amplification of filtered signal (35) by amplifier (29). Amplifier (29) can boost the signal level, and amplified signal (36) can then pass through RF isolator (30) and additional bandpass (31) and low-pass (32) filters to remove unwanted signal components from amplified signal (37). Amplified signal (37) can then be injected into RF doubler circuit (33) that multiplies the signal time-bandwidth property by a factor of two, for example. Doubled waveform (38) can then pass through another RF isolator (34) and emerge at output (26) of the radio frequency doubling stage. This waveform time-bandwidth modification process can be repeated M times to achieve final waveform bandwidth (19), as described by Equation 1.

Typically, creating final RF waveform (19) from baseband RF waveform (18) tends to include significant amounts of extremely high performance RF circuitry, such as (4), (5) and (6) shown in FIG. 1 and the components described above in FIG. 4, to modify the time-bandwidth properties of the RF waveform. As the ratio of RF waveform to RF device bandwidth, or fractional bandwidth, approaches unity, RF performance specifications, including gain, gain uniformity, output power, output ripple, phase shift and group delay are extremely difficult to achieve. Thus, a simpler method for creating optical waveforms with large time-bandwidth products is desired.

In accordance with various aspect of the present disclosure, a Mach-Zehnder RF to Optical Transfer Function can be exploited to simplify the overall system architecture of FIG. 1. As such, the synthesis of multiple optical harmonics can be used to reduce the number of stages, M, of RF upconversion circuitry, such as (4), (5) and (6) of FIG. 1 and the components shown in FIG. 4.

Figure 5:
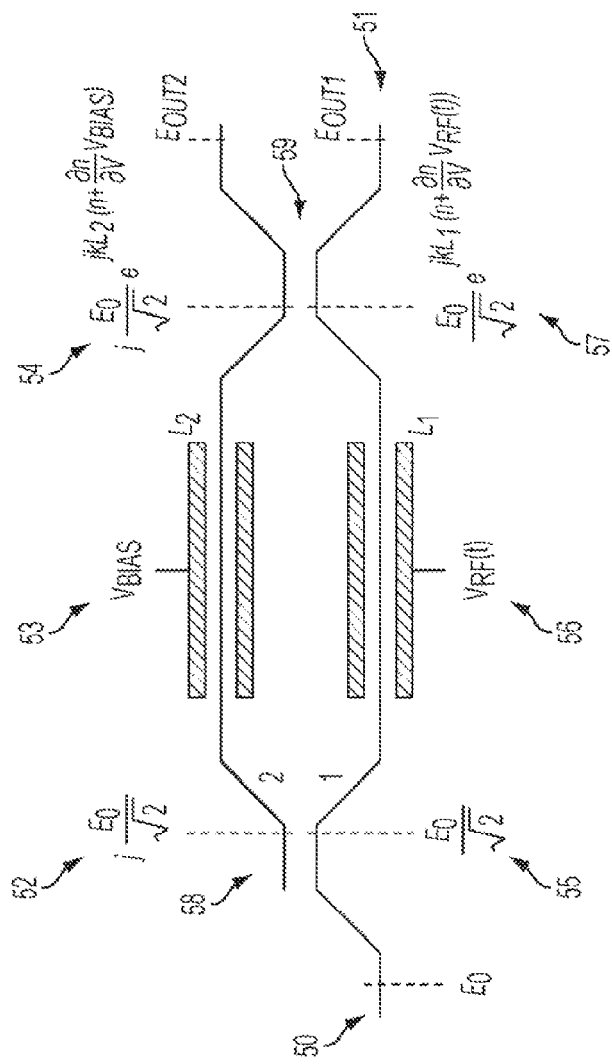
FIG. 5 shows an example block diagram of a Mach-Zehnder RF-to-optical modulator in accordance with various aspects of the present disclosure.

FIG. 5 shows a block diagram of Mach-Zehnder RF to optical modulator of Reference 9 of FIG. 1, and the associated phase terms that describe the optical wavefronts inside the device at the locations specified by the dashed lines. The optical carrier is injected into the Mach-Zehnder input port (50) (also shown at 13 in FIG. 1) and is divided (58) into optical signals of equal power but with 90 degree phase shift (52), (55). After the voltage bias (53) is applied, one optical path, arm 2, of the Mach-Zehnder has phase given by the amplitude and phase (54) in FIG. 5. The other signal (55) in arm 1 is modified according to the RF input signal (56) (also shown at 19 in FIG. 1) and has resulting amplitude and phase (57). The optical paths of the Mach-Zehnder are optically mixed (59), producing the final output optical waveform (51).

Equation 2 defines the complex electric field of the optical carrier at the Mach-Zehnder output 51.

$$E_{OUT1} = \frac{E_0}{2}e^{jkL_1\left(n+\frac{\partial n}{\partial V}V_{RF}(t)\right)} - \frac{E_0}{2}e^{jkL_2\left(n+\frac{\partial n}{\partial V}V_{BIAS}\right)} \quad (2)$$

Equation 3, which defines the optical intensity at the Mach-Zehnder output 51, can be derived from Equation 2.

$$I^2_{OUT1} = E_{OUT1}E^*_{OUT1} = \quad (3)$$

$$\frac{E_0^2}{2}\left[1 - \cos\left(kL_2\left(n+\frac{\partial n}{\partial V}V_{BIAS}\right) + kL_1\left(n+\frac{\partial n}{\partial V}V_{RF}(t)\right)\right)\right]$$

The first cosine function term in Equation 3, involving $V_{BIAS}$, is purely a static phase term that changes when the applied bias voltage is altered. The second cosine function term in Equation 3 is related to the input RF signal (56) (also shown at 14 in FIG. 1), $V_{RF}(t)$, defined below in Equation 4. The bandwidth of the signal, $\Delta f_{FINAL}$, in Equation 4 is determined by modifying the baseband RF waveform (18) time-bandwidth product M times, per Equation 1.

Equation 4. Definition of Input RF Signal, $V_{RF}(t)$.

$$V_{RF}(t) = \Delta f_{BASEBAND} * 2^M = \sin\left(2\pi f t + \frac{\mu t^2}{2}\right) * 2^M \quad (4)$$

Equation 4 can be substituted into Equation 3 to produce Equations 5, 6 and 7 which define the Mach-Zehnder optical output signal (51) as a function of the bias voltage (53) and input RF signal (56). Collectively, Equations 5, 6 and 7 are known as the Mach-Zehnder RF-to-Optical Transfer Function.

$$I^2_{OUT1} = E_{OUT1}E^*_{OUT1} = \frac{E_0^2}{2}[1 - \cos(\phi_{BIAS} + \phi_{RF}(t))] \quad (5)$$

$$\phi_{BIAS} = kL_2\left(n + \frac{\partial n}{\partial V}V_{BIAS}\right) \quad (6)$$

$$\phi_{RF}(t) = kL_1\left(n + \frac{\partial n}{\partial V}\left[\sin\left(2\pi ft + \frac{ut^2}{2}\right)*2^M\right]\right) \quad (7)$$

Figure 6:
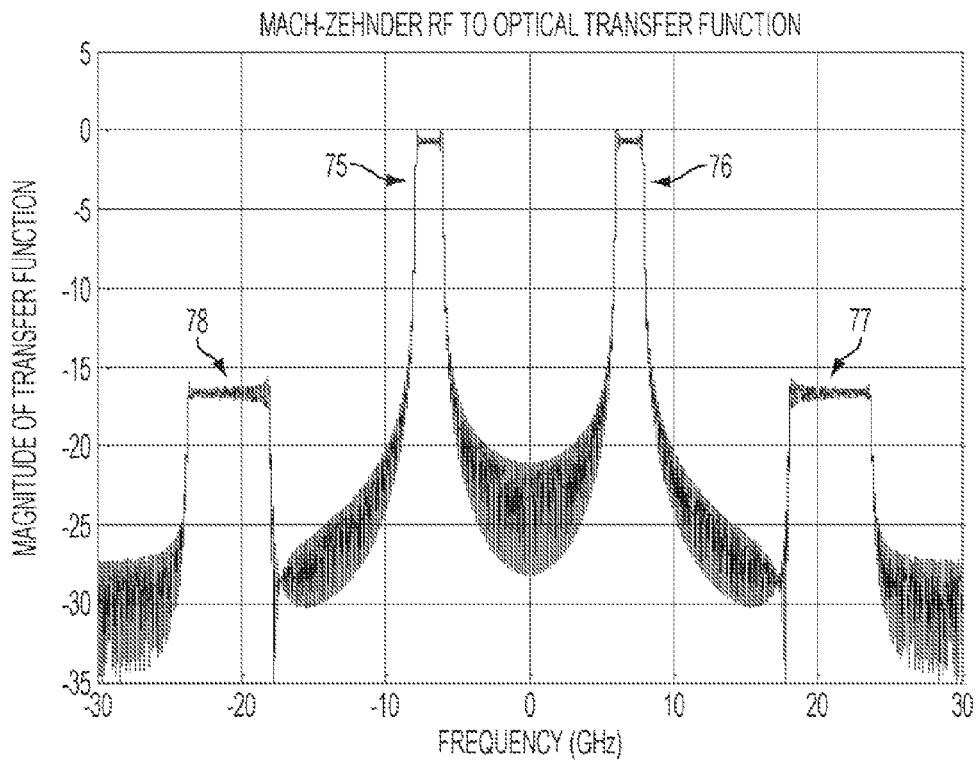
FIG. 6 shows Matlab simulation of Mach-Zehnder RF-to-Optical Transfer Function.

FIG. 6 shows Matlab simulation of Equations 5, 6 and 7 using arbitrarily chosen final RF waveform (19) signal properties. The optical output of Mach-Zehnder (51) or the magnitude of the transfer function as described in relation to Equations 5, 6 and 7 is plotted on the y-axis with optical power in dB. The x-axis represents frequency in GHz relative to the Mach-Zehnder optical carrier input (50) (also shown at 13 in FIG. 1). Applying the proper voltage bias to $V_{BIAS}$ on the Mach-Zehnder bias port (53) can set $\phi_{BIAS}$ of Equation 6 to be equal to $\pi/2$ radians. This bias point causes the Mach-Zehnder modulator to produce a DSB-SC optical signal (51) (also shown at 16 in FIG. 1) containing multiple harmonic sidebands of the optical carrier. FIG. 6 depicts this multi-harmonic DSB-SC optical signal containing the first-order upper sideband (76), first-order lower sideband (75), second-order upper sideband (77) and second-order lower sideband (78).

As can been seen in FIG. 6, second-order optical sidebands (77), (78) have twice the bandwidth of first-order optical sidebands (75), (76). Exploiting the Mach-Zehnder RF to Optical Transform function enables M stages of waveform time-bandwidth modification to be split between RF circuitry (4), (5) and (6) and Mach-Zehnder modulator (9). Thus, Equation 1 can be re-written as Equation 8 below, describing how the synthesis of the $N^{th}$ optical harmonic in the Mach-Zehnder modulator (Equations 5, 6, 7 and FIG. 6) can be used to simplify the design of RF doubler stages (4), (5) and (6), thus reducing the stage count from M to M−N+1.

$$\Delta f_{FINAL} = (2^{M-N+1})(2^{N-1})*\Delta f_{BASEBAND} \quad (8)$$

Figure 7:
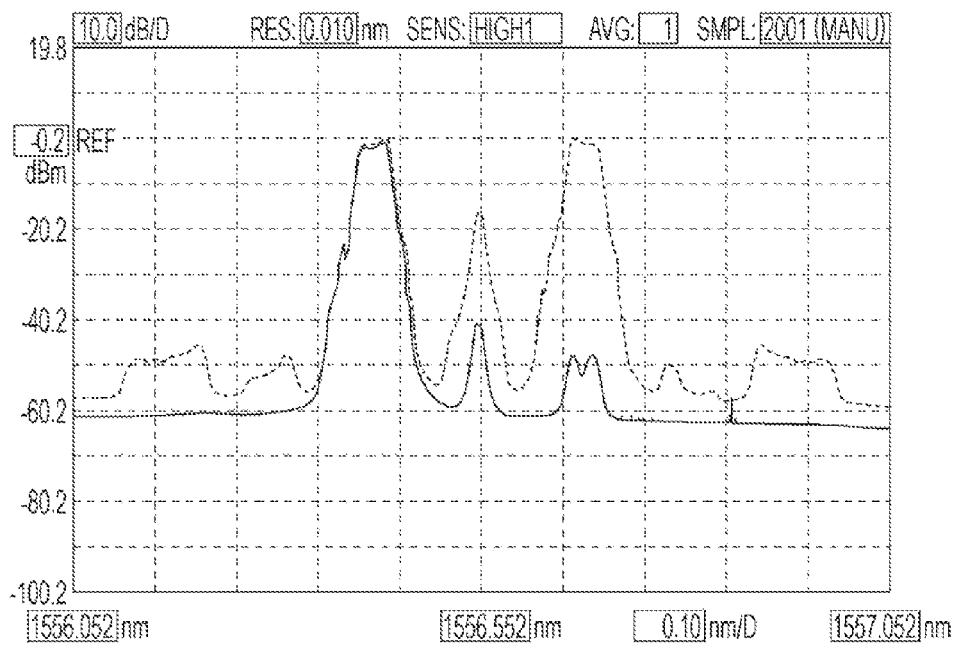
FIG. 7 shows optical filtering of sidebands via a Fiber Bragg Grating.

FIG. 7 shows an optical spectrum measured by an Ando AQ6319 Optical Spectrum Analyzer, and represents the laboratory measurements of the system architecture described in FIG. 1 and the Mach-Zehnder modulator simulation of FIG. 6. The multi-sideband DSB-SC optical waveform (white dotted line, FIG. 7) possessing frequency spectrum similar to FIG. 2 can be filtered via Fiber Bragg Grating (11) to remove unwanted sidebands leaving a SSB-SC optical waveform (17); the black trace in FIG. 7 represents the optically filtered SSB-SC optical waveform (17) possessing a frequency spectrum depicted in FIG. 3. The x-axis of FIG. 7 is shown in nanometers, instead of frequency, hence the upper sidebands are shown on the left hand side near the shorter wavelength and corresponding higher frequency portion of the plot.

Figure 8:
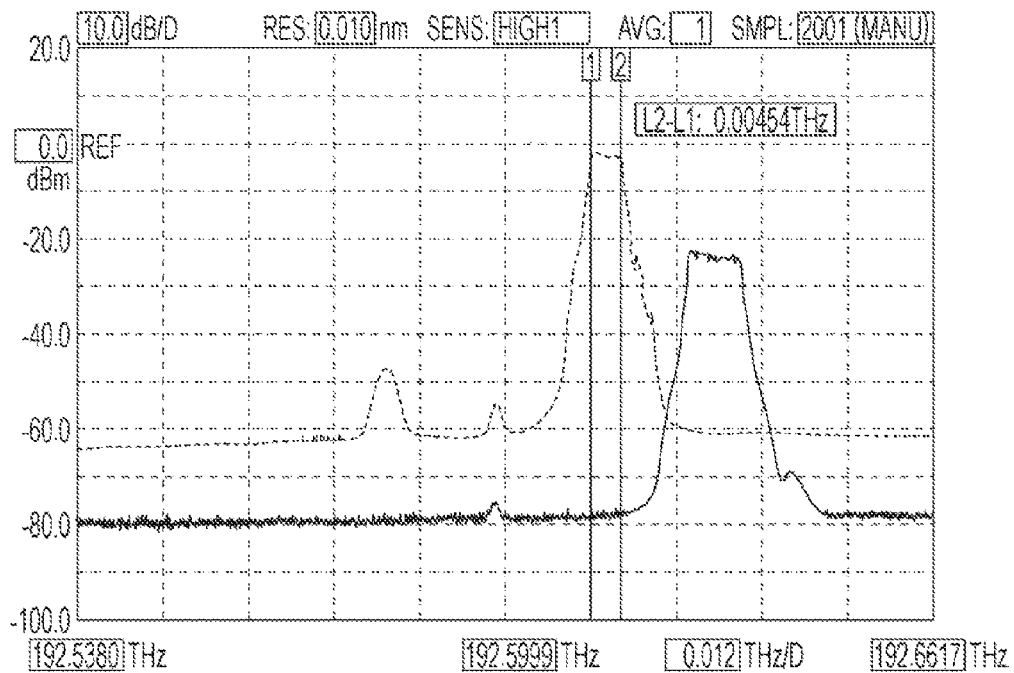
FIG. 8 shows a bandwidth measurement of first-order (N=1) upper optical sideband.

Baseband RF waveform 18 with 500 MHz bandwidth underwent three stages (M=3) of time-bandwidth modification (4), (5) and (6), producing final RF waveform (19) with 4 GHz bandwidth. 4 GHz final RF waveform (19) was modulated onto 1.5 μm optical carrier (8), and used to produce 4 GHz first-order (N=1) SSB-SC optical waveform (17, FIG. 3) shown on the dotted trace of the Ando AQ6319 optical spectrum analyzer depicted of FIG. 8.

Figure 9:
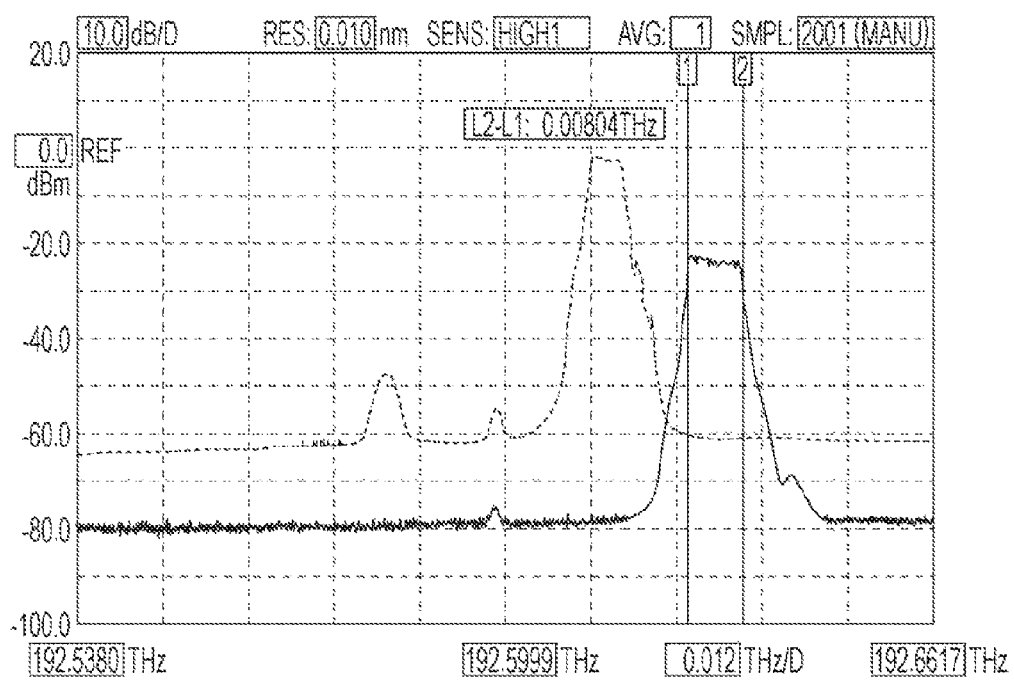
FIG. 9 shows a bandwidth measurement of second-order (N=2) upper optical sideband.

Creating 8 GHz SSB-SC optical waveform 17 would require 4 stages (M=4) of time-bandwidth modification (4), (5) and (6) given an identical baseband RF waveform (18) of 500 MHz bandwidth and a Mach-Zehnder producing a first-order (N=1) optical harmonic. Exploitation of Mach-Zehnder RF to Optical Transfer Function, as described in Equations 5, 6 and 7, in conjunction with Fiber Bragg Grating filters (11), enabled the synthesis of an $2^{nd}$ harmonic (N=2) 8 GHz SSB-SC optical waveform (17) using the same three stages (M=3) of time-bandwidth modification (4), (5) and (6) as the 4 GHz waveform. This 8 GHz SSB-SC optical waveform, including bandwidth measurement, is plotted as the black trace in FIG. 9.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is being claimed:

1. A method of increasing waveform bandwidth of an optical waveform during double sideband suppressed carrier modulation, the method comprising:
   receiving a radio frequency waveform by a bandwidth multiplier;
   increasing a bandwidth of the received radio frequency waveform;
   providing the bandwidth increased radio frequency waveform to an optical modulator; and
   creating multiple optical harmonics of the radio frequency waveform during modulation of an optical carrier to produce a dual sideband suppressed carrier optical waveform, the sidebands having additional waveform bandwidth.

2. The method according to claim 1, wherein the optical modulator includes a Mach-Zehnder optical modulator.

3. The method according to claim 2, further comprising:
   biasing the Mach-Zehnder optical modulator by a direct current power source; and
   operating the Mach-Zehnder optical modulator in a dual sideband suppressed carrier mode.

4. The method according to claim 1, further comprising:
   optically filtering the dual sideband suppressed carrier optical waveform to create a single sideband suppressed carrier waveform by an optical bandpass filter.

5. The method according to claim 1, wherein the bandwidth of the radio frequency waveform is increased by performing one or more bandwidth doubling operations by a radio frequency doubler prior to being modulated onto the optical carrier by the optical modulator.

6. The method according to claim 1, further comprising:
   providing one or more digital waveform samples into a digital to analog converter to produce the received radio frequency waveform.

7. The method according to claim 4, wherein the optical bandpass filter includes a Fiber Bragg Grating.

8. The method according to claim 1, wherein the bandwidth increased radio frequency waveform is provided to a radio-frequency input of the optical modulator.

9. An apparatus for increasing waveform bandwidth of an optical frequency waveform during double sideband suppressed carrier modulation, the apparatus comprising:
   a bandwidth multiplier arranged to receive a radio frequency waveform and to increase a bandwidth of the received radio frequency waveform; and
   an optical modulator arranged to receive the bandwidth increased radio frequency waveform, wherein the optical modulator is arranged to create multiple optical harmonics of the radio frequency waveform during modulation of an optical carrier to produce a dual sideband suppressed carrier optical waveform, the sidebands having additional waveform bandwidth.

10. The apparatus according to claim 9, wherein the optical modulator includes a Mach-Zehnder optical modulator.

11. The apparatus according to claim 10, wherein the Mach-Zehnder optical modulator is arranged to be biased by a direct current power source and operated in a dual sideband suppressed carrier mode to create the multiple optical harmonics of the radio frequency waveform.

12. The apparatus according to claim 9, further comprising:
   an optical bandpass filter that is configured to filter the dual sideband suppressed carrier optical waveform and create a single sideband suppressed carrier waveform at an output thereof.

13. The apparatus according to claim 9, wherein the bandwidth of the radio frequency waveform is increased by performing one or more bandwidth doubling operations by a radio frequency doubler prior to being modulated onto the optical carrier by the optical modulator.

14. The apparatus according to claim 9, wherein the optical modulator includes a radio-frequency input arranged to receive the bandwidth increased radio frequency waveform.

15. The apparatus according to claim 12, wherein the optical bandpass filter includes a Fiber Bragg Grating.

16. The apparatus according to claim 13, wherein the optical modulator includes a Mach-Zehnder optical modulator.

* * * * *